US009672502B2

(12) United States Patent
Chaudhary et al.

(10) Patent No.: US 9,672,502 B2
(45) Date of Patent: Jun. 6, 2017

(54) NETWORK-AS-A-SERVICE PRODUCT DIRECTOR

(71) Applicant: Verizon Patent and Licensing Inc., Basking Ridge, NJ (US)

(72) Inventors: Ashay Chaudhary, Redmond, WA (US); Ravindra Rao, Sunnyvale, CA (US); Sandeep Sharma, Fremont, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 343 days.

(21) Appl. No.: 14/271,653

(22) Filed: May 7, 2014

(65) Prior Publication Data
US 2015/0326448 A1    Nov. 12, 2015

(51) Int. Cl.
*G06F 15/173* (2006.01)
*G06Q 20/14* (2012.01)
*H04L 12/24* (2006.01)

(52) U.S. Cl.
CPC ......... *G06Q 20/14* (2013.01); *H04L 41/5041* (2013.01); *H04L 41/5054* (2013.01); *H04L 41/5096* (2013.01)

(58) Field of Classification Search
CPC .................................................. H04L 41/5041
See application file for complete search history.

(56) References Cited

U.S. PATENT DOCUMENTS

| 2004/0210895 A1* | 10/2004 | Esfahany | G06F 11/1482 717/174 |
| 2012/0178414 A1* | 7/2012 | Fiatal | H04M 3/4872 455/406 |
| 2013/0210464 A1* | 8/2013 | Mittal | H04L 67/18 455/456.5 |
| 2013/0346465 A1* | 12/2013 | Maltz | G06F 9/5072 709/201 |

OTHER PUBLICATIONS

Wikipedia, "Network as a service" http://en.wikipedia.org/wiki/Network_as_a_service, Sep. 16, 2013, 3 pages.
(Continued)

*Primary Examiner* — Michael Won
*Assistant Examiner* — Nicholas Celani

(57) ABSTRACT

A device may receive order information that may identify a network service to be provided, via a service provider network, to a service location associated with a customer. The device may determine context information associated with providing the network service. The context information may be determined based on the order information and may include information associated with a virtual network function (VNF) that is to provide the network service to the service location. The device may determine provisioning details associated with the network service. The device may generate a service request that includes the context information and the provisioning details. The device may identify a cloud resource that is to host the VNF. The device may provide the service request to the cloud resource to cause the VNF to be created and inserted into the service provider network.

20 Claims, 12 Drawing Sheets

(56) References Cited

OTHER PUBLICATIONS

Harish Vadada, "Network as a Service (NaaS)", http://www.telecom-cloud.net/network-as-a-service/, Jul. 16, 2011, 15 pages.
Wikipedia, "Network Functions Virtualization", http://en.wikipedia.org/wiki/Network_Functions_Virtualization, Apr. 24, 2014, 4 pages.

* cited by examiner

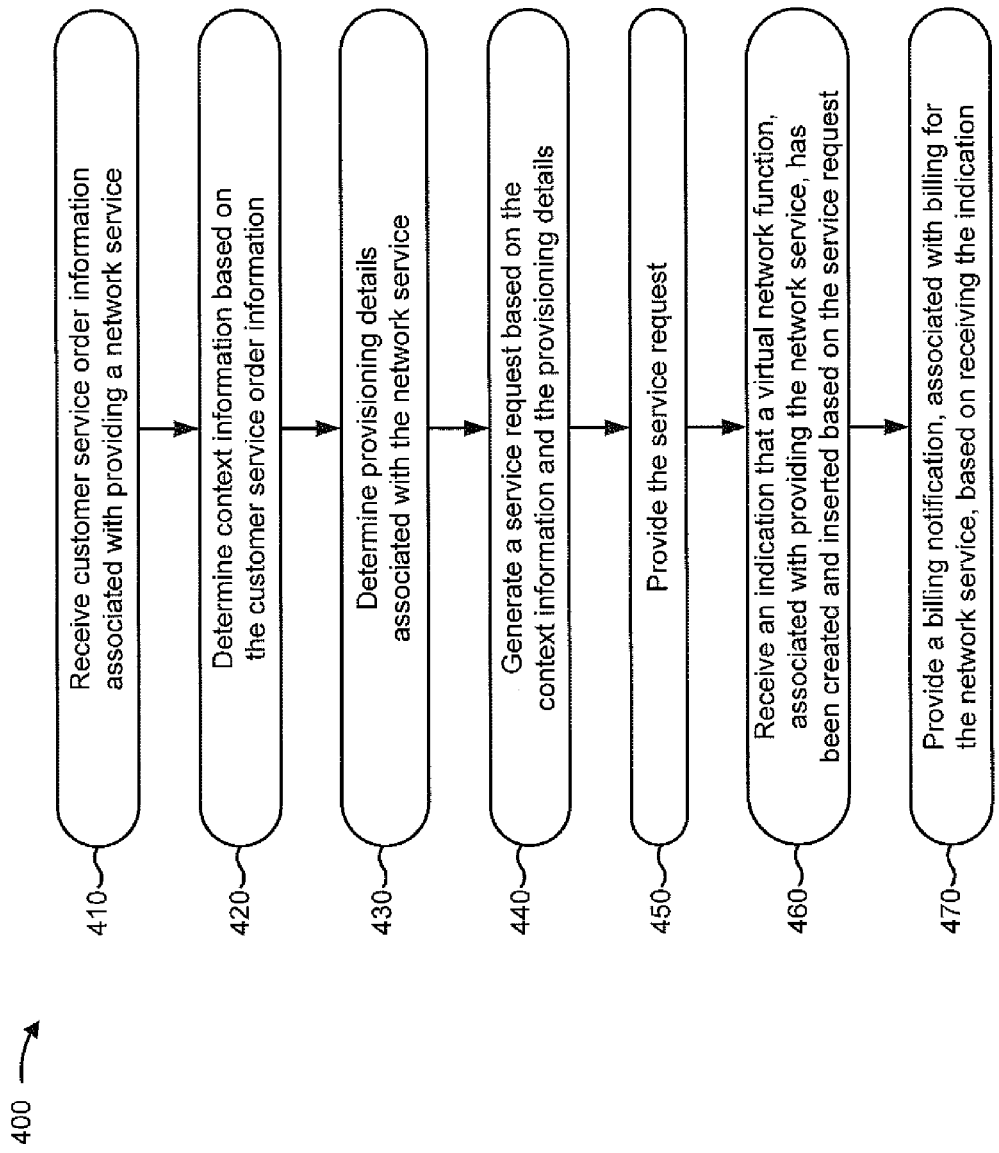

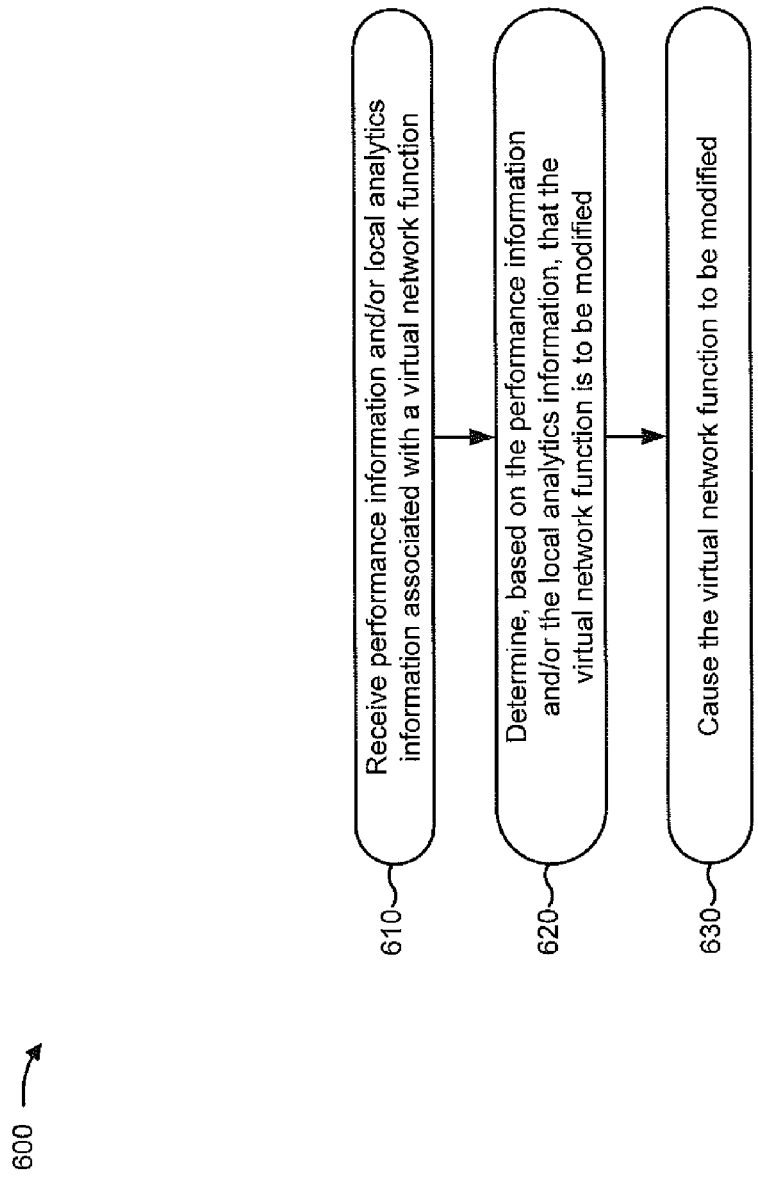

NETWORK-AS-A-SERVICE PRODUCT DIRECTOR

BACKGROUND

Network-as-a-Service (NaaS) is a service model that allows a service provider to provide a virtual network service to a third party. In some cases, NaaS may allow the service provider to provide a network service such as a virtual private network (VPN), bandwidth on demand, custom routing, multicast protocols, a security firewall, intrusion detection and prevention, content monitoring and filtering, and/or antivirus protection.

BRIEF DESCRIPTION OF THE DRAWINGS

FIG. 4 is a flow chart of an example process for receiving customer service order information, associated with providing a network service using a virtual network function, and providing a service request, based on the customer service order information, to cause the virtual network function to be created and inserted into the service provided network;

FIG. 6 is a flow chart of an example process for receiving performance information and/or local analytics information, associated with a virtual network function, and causing the virtual network function to be modified based on the performance information and/or the local analytics information.

DETAILED DESCRIPTION OF PREFERRED EMBODIMENTS

The following detailed description of example implementations refers to the accompanying drawings. The same reference numbers in different drawings may identify the same or similar elements.

A service provider, associated with a service provider network, may wish to implement a network-as-a-Service (NaaS) service model that allows the service provider to provide agile, on-demand, and/or flexible network services (e.g., virtual network services) to a service location associated with a customer. However, provisioning of network services within the service provider network may be hardware based and the service provider network may be a closed system. As such, the service provider may be forced to manually configure, monitor, update, etc. devices included in the service provider network in order to provide the network service. Moreover, updating, modifying, adjusting, etc. the network service based on a request from the customer may be difficult and time consuming (e.g., since an update would require additional manual configuration). Implementations described herein may allow virtual network functions, associated with providing network services to service locations, to be globally managed (e.g., created, inserted, configured, updated, modified, etc.) such that the network services are provided in an agile, on-demand, and/or flexible manner without the need to manually configure, monitor, and/or update physical devices in the service provider network.

Figure 1A:
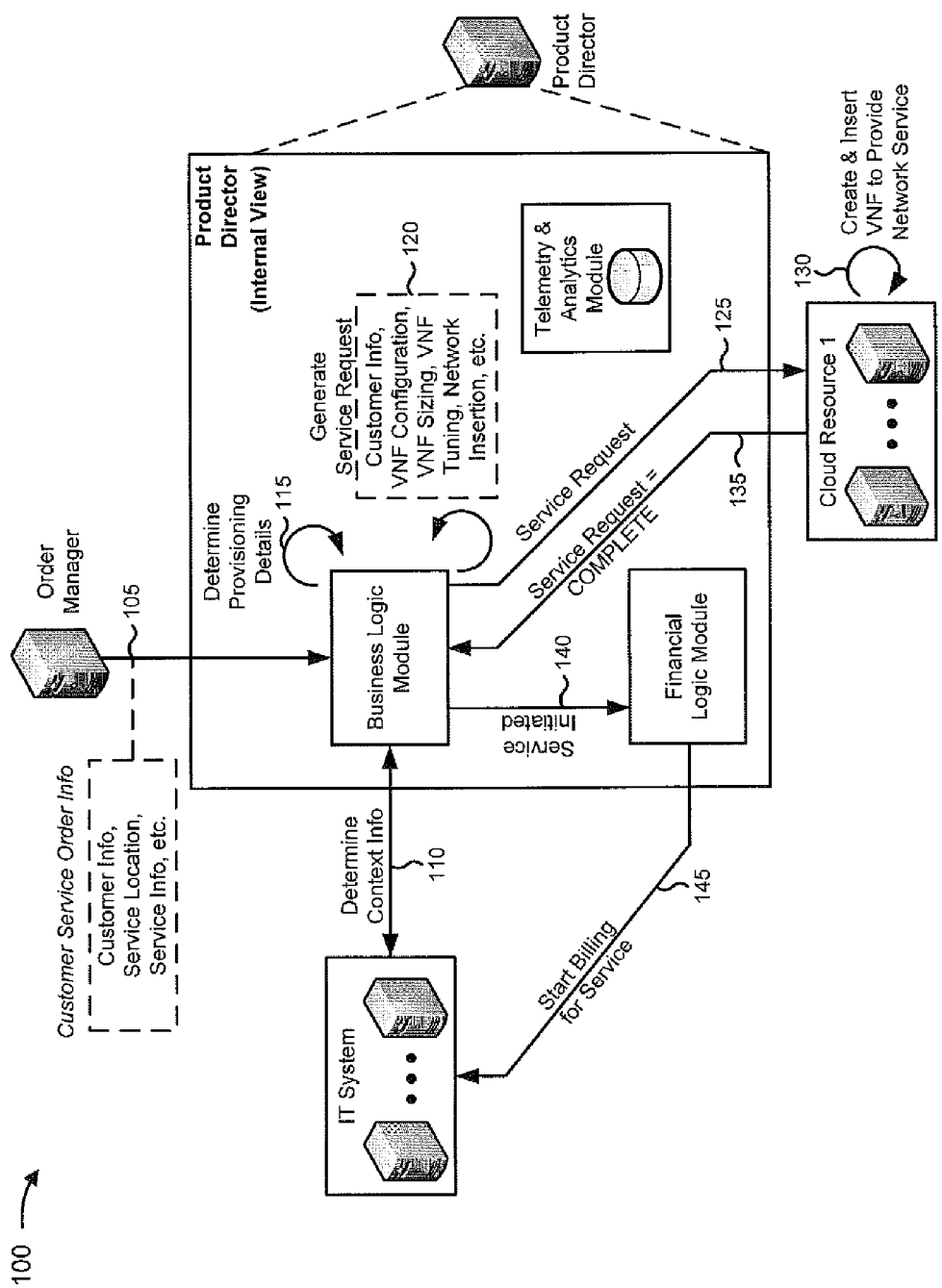
FIGS. 1A-1C are diagrams of an overview of an example implementation described herein.
Figure 1B:
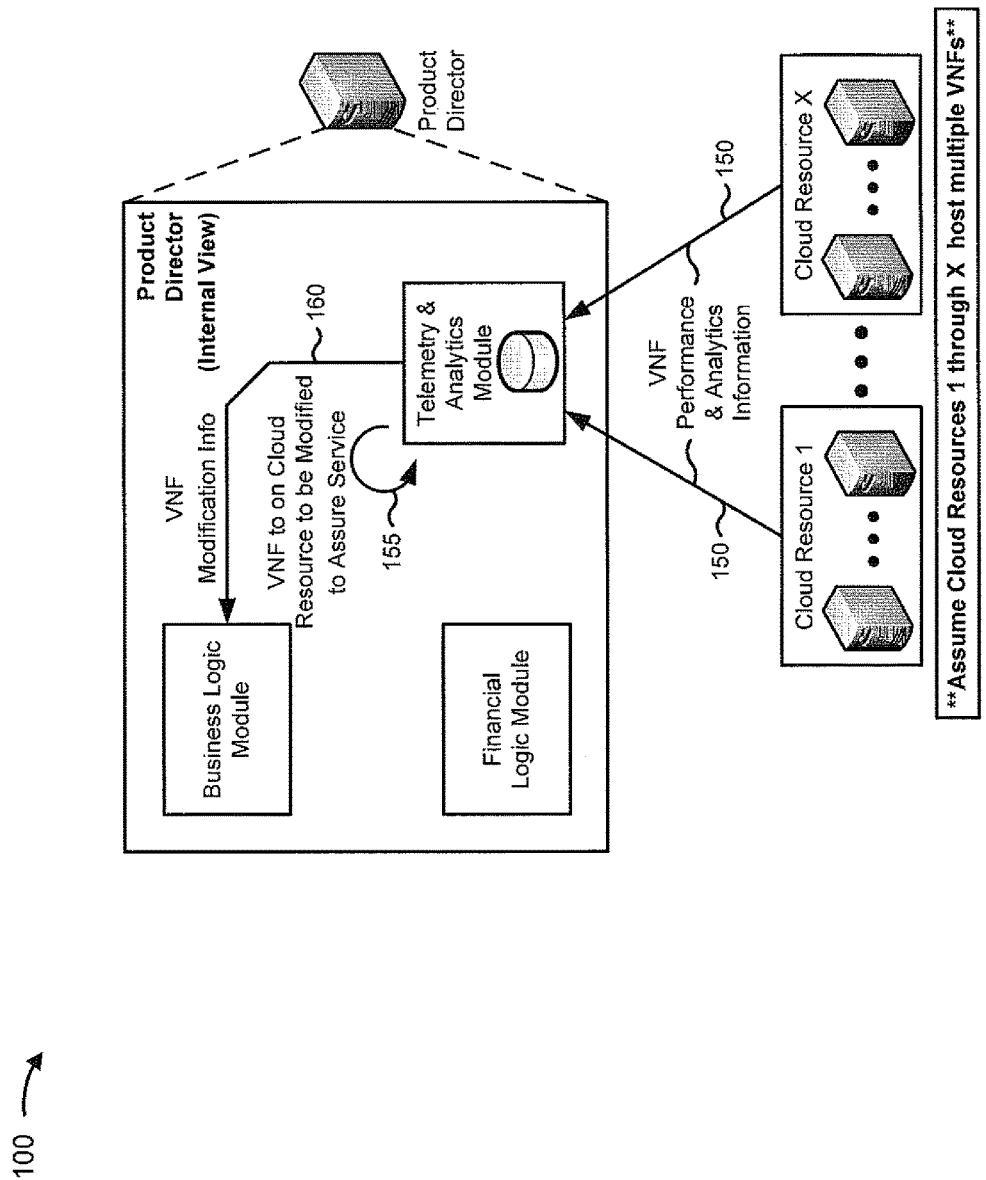
Figure 1C:
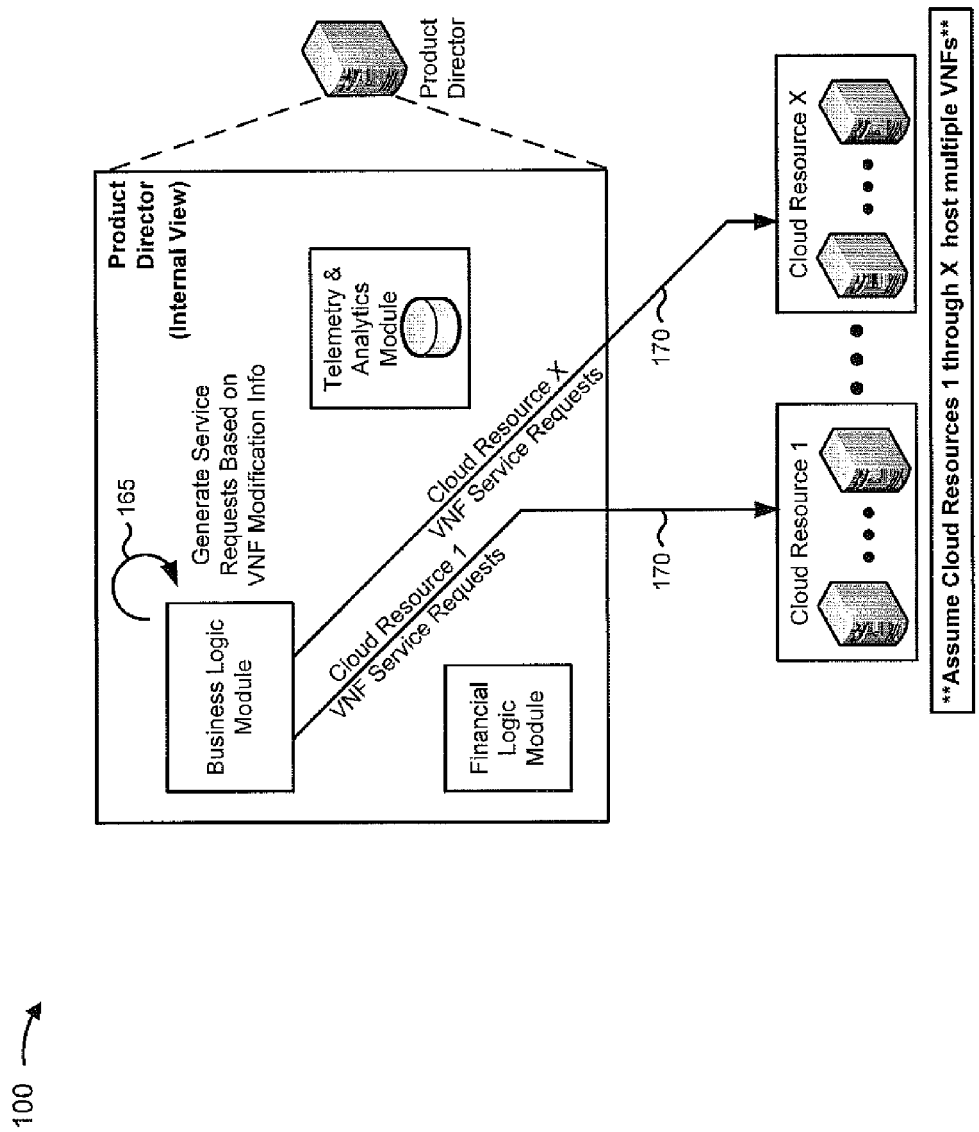

FIGS. 1A-1C are diagrams of an overview of an example implementation 100 described herein. For the purposes of example implementation 100, assume that a customer, associated with a service provider network, wishes for a network service to be provided to a service location associated with the customer. Further, assume that the customer has provided (e.g., via user interface associated with the service provider network and displayed via a customer device) customer service order information associated with the network service. Finally, assume that customer device has provided the customer service order information to an order manager associated with the service provider network.

As shown in FIG. 1A, and by reference number 105, the order manager may forward the network service information to a product director (e.g., a device associated with globally managing provisioning of network services). As shown, assume that the product director includes multiple software modules, including a business logic module, a financial logic module, and a telemetry and analytics module. As shown, the business logic module may receive the customer service order information provided by the order manager. As shown, the customer service order information may include information associated with the customer, information associated with the service location, information associated with the network service, and/or other information associated with providing the network service to the service location.

As shown by reference number 110, the business logic module may communicate with an information technology (IT) system, associated with the service provider network, to determine context information (e.g., information associated with providing the network service to the service location via the service provider network) based on the customer service order information. As shown by reference number 115, the business logic module may determine (e.g., based on the context information, based on an algorithm, based on the customer service order information, etc.) provisioning details associate with the network service. As shown by reference number 120, the business logic module may generate a service request based on the context information and the provisioning details. As shown, the service request may include information associated with the customer, information associated with configuring a virtual network function (VNF) that is to provide the network service, sizing information associated with the VNF, tuning information associated with the VNF, network insertion information associated with inserting the VNF into the service provider network, and/or other information associated with providing the network service to the service location. As shown by reference number 125, the business logic module may identify a cloud resource (e.g., one or more computing devices included in a cloud computing environment, etc.), cloud resource 1, that is to host the VNF, and may provide the service request to cloud resource 1.

As further shown in FIG. 1A, and by reference number 130, cloud resource 1 may create the VNF and insert the VNF into the service provider network based on the service request (e.g., such that the network service is provided to the service location via the service provider network). As shown by reference number 135, cloud resource 1 may provide, to the business logic module of product director 230, an indication that the VNF was successfully created and inserted into the service provider network. As shown by reference number 140, the business logic module may receive the indication, and may provide, to the financial logic module of the product director, information indicating that provision of the network service has been initiated. As shown by reference number 145, the financial logic module may provide, to the IT system, information indicating that customer billing, associated with the network service, should begin (e.g., and billing may begin, accordingly).

As shown in FIG. 1B, assume that the product director has generated and provided multiple service requests that have caused multiple VNFs to be created on various cloud resources (e.g., cloud resource 1 through cloud resource X) managed by the product director. Further, assume that each cloud resource is configured to collect performance information associated with VNFs running on the cloud resource, and that each cloud resource is configured to perform local analytics, based on the performance information, to determine local analytics information. Finally, assume that each cloud resource is configured to provide the performance information and the local analytics information to the product director.

As shown by reference number 150, each cloud resource may provide (e.g., in real-time, on a periodic basis, etc.), to the telemetry and analytics module of the product director, the performance information and/or the analytics information determined by the cloud resources. As shown, by reference number 155 the telemetry and analytics module may receive the performance information and/or the local analytics information from each cloud resource, and may determine (e.g., based on performing global analytics based on the performance information and/or the local analytics information), that a group of VNFs (e.g., of the multiple VNFs) are to be modified (e.g., updated, reconfigured, relocated, recreated, adjusted, etc.) to assure that network services, corresponding to the group of VNFs, are adequately provided (e.g., provided in accordance with service level agreements (SLAs) associated with the network services). As shown by reference number 160, the telemetry and analytics module may provide, to the business logic module, VNF modification information associated with the group of VNFs that are to be modified.

As shown in FIG. 1C, and by reference number 165, the business logic module may receive the VNF modification information, and may generate a group of service requests, where each service request corresponds to a VNF of the group of VNFs that are to be modified. As shown by reference number 170, the business logic module may provide the group of service requests to the cloud resources. The cloud resources may receive the service requests, and may modify the VNFs accordingly.

In this way, virtual network functions, associated with providing network services, may be globally managed (e.g., created, inserted, configured, updated, modified, etc.) such that the network services are provided in an agile, on-demand, and/or flexible manner without the need to manually configure, monitor, and/or update devices in the service provider network.

Figure 2:
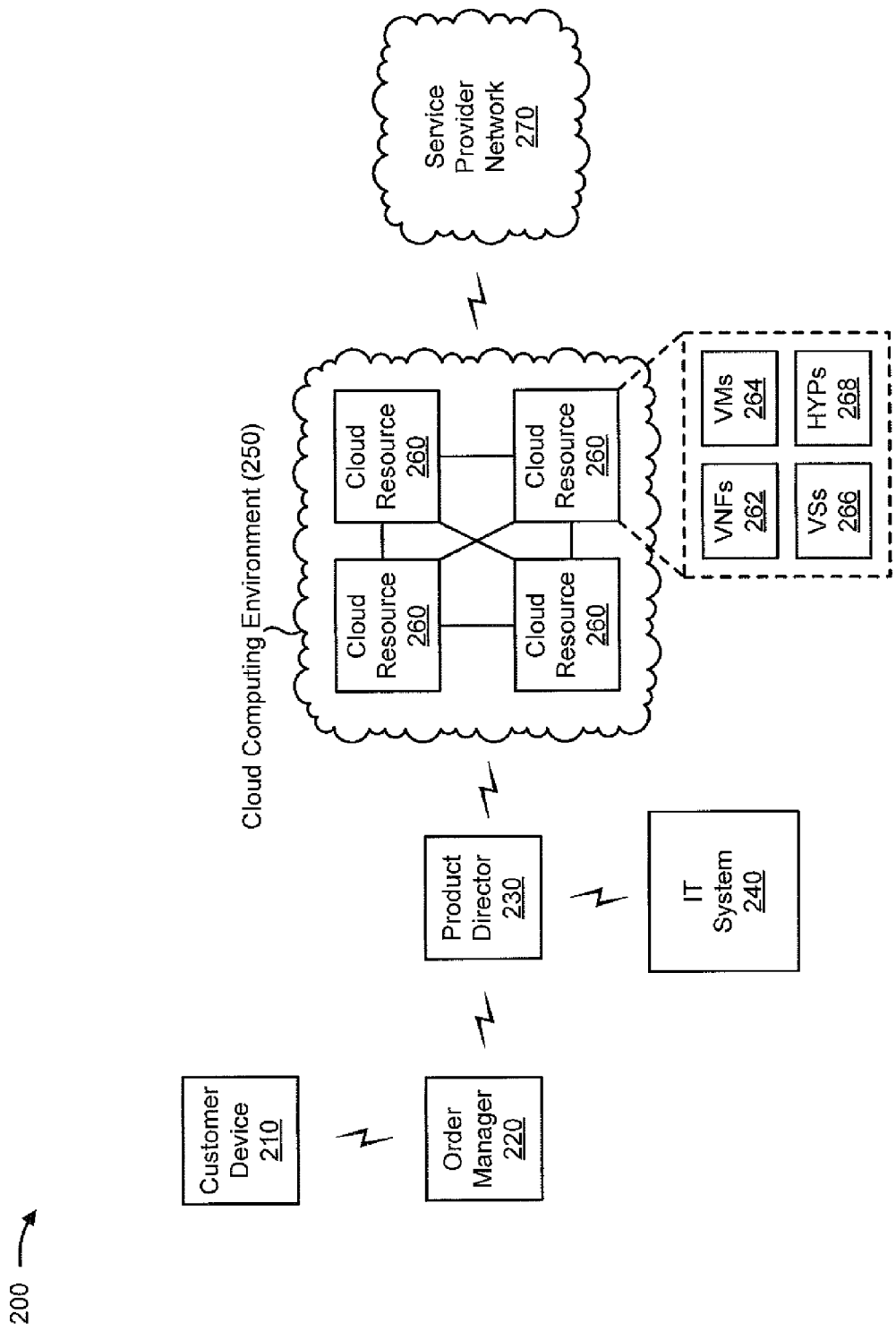
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a customer device 210, an order manager 220, a product director 230, an information technology (IT) system 240, a cloud computing environment 250, and a service provider network 270. Cloud computing environment may include a group of cloud resources 260. Devices of environment 200 may interconnect via wired connections, wireless connections, or a combination of wired and wireless connections.

Customer device 210 may include a device capable of receiving, processing, and/or providing information (e.g., customer service order information). For example, customer device 210 may include a mobile phone (e.g., a smart phone, a radiotelephone, etc.), a computing device (e.g., a laptop computer, a tablet computer, a handheld computer, a gaming device, etc.), a network device (e.g. Customer Premises Equipment (CPE), a router, etc.), or a similar device. In some implementations, customer device 210 may be host an application (e.g., a user input web portal, a cloud services portal, etc.), that may allow the user to provide customer service order information associated with a network service. In some implementations, customer device 210 may include a communication interface that allows customer device 210 to receive (e.g., based on user input) customer service order information associated with providing a network service to a service location. Additionally, or alternatively, customer device 210 may be capable of providing the customer service order information to another device in environment 200 (e.g., order manager 220).

Order manager 220 may include one or more devices capable of receiving, storing, processing, generating, and/or providing customer service order information. For example, order manager 220 may include a server device or a collection of server devices. In some implementations, order manager 220 may include a communication interface that allows order manager 220 to receive customer service order information from customer device 210 and/or forward the customer service order information to other devices in environment 200 (e.g., product director 230). In some implementations, order manager 220 may include a device capable of receiving the customer service order information, verifying the customer service order information, and/or authenticating a customer associated with the customer service order information.

Product director 230 may include one or more devices capable of receiving, storing, processing, generating, and/or providing customer service order information, context information associated with the customer service order information, and/or another type of information. For example, order manager 220 may include a server device or a collection of server devices. In some implementations, product director 230 may be capable of communicating with order manager 220 to receive customer service order information. Additionally, or alternatively, product director 230 may be capable of communicating with IT system 240 to determine context information associated with the customer service order information received from order manager 220. Additionally, or alternatively, product director 230 may be capable of generating a service request based on the context information received from IT system 240, and providing the service request to cloud resource 260.

In some implementations, product director 230 may include software associated with determining context information and/or provisioning details associated with customer service order information, generating a service request, determining and/or providing billing information, receiving performance information associated with a VNF, performing global analytics based on the performance information, and/or another function. For example, product director 230 may host one or more software modules, such as a business logic module, a financial logic module, a telemetry module, and/or an analytics module. In some implementations, these modules may cooperate in order to globally manage multiple VNFs operating on multiple cloud resources 260.

In some implementations, product director 230 may be associated with multiple cloud resources 260. For example, product director 230 may be configured to manage network services provided via a group of cloud resources 260. In some implementations, each product director 230 could be associated with a respective geographic region and cloud resources 260 also associated with that respective geographic region. Additionally, or alternatively, each product director 230 could be associated with a respective logical group of cloud resources 260 (e.g., a group of cloud resources 260 associated with providing network services at a particular time, a group of cloud resources 260 associated with a particular customer type, a group of cloud resources associated with providing network services within a particular price band, etc.). Additionally, or alternatively, product director 230 may be capable of identifying a particular cloud resource 260 that is to create and insert a network service associated with customer service order information received from order manager 220. In some implementations, product director 230 may be capable of receiving performance information and/or local analytics information from the multiple cloud resources 260, and performing global service assurance associated with the multiple cloud resources 260.

IT system 240 may include one or more devices capable of receiving, storing, processing, generating, and/or providing context information and/or another type of information. For example, IT system 240 may include a server device or a collection of server devices. In some implementations, IT system 240 may be capable of communicating with product director 230 to provide context information associated with customer service order information. In some implementations, IT system 240 may include one or more devices (e.g., server devices) that are configured to store context information and/or to provide the context information to product director 230.

Cloud computing environment 250 may include an environment that delivers computing as a service, whereby shared resources, services, etc. may be provided to customer device 210. Cloud computing environment 250 may provide computation, software, data access, storage, etc. services that do not require end-user (e.g., customer device 210) knowledge of a physical location and configuration of system(s) and/or device(s) that deliver the services.

As shown, cloud computing environment 250 may include a group of cloud resources 260 (referred to collectively as "cloud resources 260" and individually as "cloud resource 260").

Cloud resource 260 may include one or more computing devices. In some implementations, cloud resource 260 may provide network services to customer device 210. The network services may use compute instances executing in cloud resource 260, storage devices provided in cloud resource 260, data transfer operations executed by cloud resource 260, etc. In some implementations, cloud resource 260 may communicate with other cloud resources 260 via wired connections, wireless connections, or a combination of wired and wireless connections. In some implementations, one or more cloud resources 260 may be assigned (e.g., by a device associated with a service provider, etc.) to receive, process, store and/or provide traffic, associated with a customer, in accordance with an agreement (e.g., a service level agreement ("SLA")).

In some implementations, cloud resource 260 may be capable of receiving a service request associated with providing a network service, creating a VNF associated with the network service (e.g., within cloud resource 260), and inserting the VNF into service provider network 270 (e.g., such that the network service is provided via the VNF). In some implementations, cloud resource 260 may be capable of determining performance information associated with network services provided via VNFs running on cloud resource 260, and performing local service assurance based on the performance information and/or local analytics information determined by cloud resource 260.

As further shown in FIG. 2, cloud resource 260 may include a group of resources, such as one or more virtual network functions ("VNFs") 262, one or more virtual machines ("VMs") 264, virtualized storage ("VSs") 266, one or more hypervisors ("HYPs") 268, etc.

VNF 262 may include one or more network functions that may be provided to or accessed by customer device 210. VNF 262 may eliminate a need to install and execute the network functions on customer device 210 and/or another device associated with customer device 210. For example, VNF 262 may include a network function associated with a firewall, a load balancer, malware detection, and/or any other network function capable of being provided via cloud computing environment 250. In some implementations, one VNF 262 may send/receive information to/from one or more other VNF 262, via virtual machine 264.

Virtual machine 264 may include a software implementation of a machine (e.g., a computer) that executes programs like a physical machine. Virtual machine 264 may be either a system virtual machine or a process virtual machine, depending upon use and degree of correspondence to any real machine by virtual machine 264. A system virtual machine may provide a complete system platform that supports execution of a complete operating system ("OS"). A process virtual machine may execute a single program, and may support a single process. In some implementations, virtual machine 264 may execute on behalf of a customer (e.g., customer device 210) to provide a network service to a service location associated with the customer. In some implementations, a VNF may correspond to one or more VNFs 262, virtual machines 264, virtualized storages 266, and/or hypervisors 268.

Virtualized storage 266 may include one or more storage systems and/or one or more devices that use virtualization techniques within the storage systems or devices of cloud resource 260. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 268 may provide hardware virtualization techniques that allow multiple virtual machines 264 to execute concurrently on a host computer, such as computing resource 260. Hypervisor 268 may present a virtual operating platform to virtual machines 264, and may manage the execution of the virtual machines 264. Multiple instances of a variety of virtual machines 264 may share virtualized hardware resources. Hypervisor 268 may provide an interface to infrastructure as a service provided by cloud computing environment 250.

Service provider network 270 may include one or more wired and/or wireless networks associated with a service provider. For example, service provider network 270 may include a cellular network, a public land mobile network (PLMN), a second generation (2G) network, a third generation (3G) network, a fourth generation (4G) network, a fifth generation (5G) network, a long term evolution (LTE) network, and/or a similar type of network. Additionally, or alternatively, service provider network 270 may include a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a satellite network, a cloud computing network, and/or a combination of these or other types of networks. In some implementations, service provider network 270 may include network devices (e.g., base stations, gateways, routers, modems, switches, network interface cards ("NIC"), hubs, bridges, servers, etc.) that may be configured to provide a network service to a service location associated with a customer.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
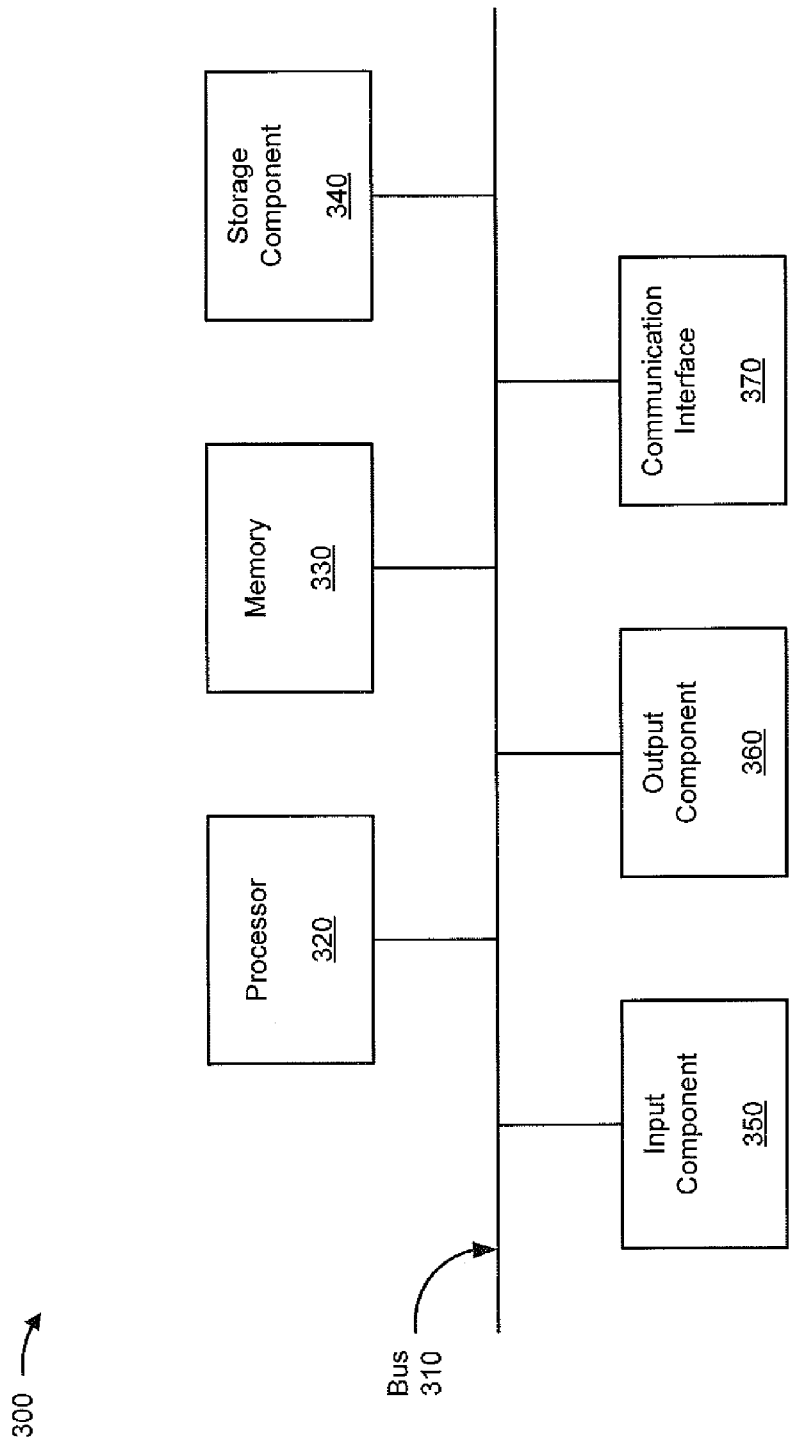
FIG. 3 is a diagram of example components of one or more devices of FIG. 2.

FIG. 3 is a diagram of example components of a device 300. Device 300 may correspond to customer device 210, order manager 220, product director 230, one or more devices of IT system 240, and/or cloud resource 260. In some implementations, customer device 210, order manager 220, product director 230, IT system 240, and/or cloud resource 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for receiving customer service order information, associated with providing a network service using a virtual network function, and providing a service request, based on the customer service order information, to cause the virtual network function to be created and inserted into the service provider network. In some implementations, one or more process blocks of FIG. 4 may be performed by product director 230. In some implementations, one or more process blocks of FIG. 4 may be performed by another device or a group of devices separate from or including product director 230, such as another device included in environment 200.

As shown in FIG. 4, process 400 may include receiving customer service order information associated with providing a network service (block 410). For example, product director 230 (e.g., a business logic module of product director 230) may receive customer service order information associated with providing a network service. In some implementations, product director 230 may receive the customer service order information after order manager 220 provides the customer service order information. Additionally, or alternatively, product director 230 may receive the customer service order information after order manager 220 verifies the customer service order information and/or authenticates a customer associated with the customer service order information.

Customer service order information may include information associated with a network service to be provided to a service location via a service provider network. For example, the customer service order information may include information that identifies a customer associated with the network service (e.g., a customer name, a customer identification (ID) number, a customer username, a customer password, SLA information associated with the customer, etc.), information that identifies the network service (e.g., a name of the service, a service type of the service, etc.), information that identifies the service location (e.g., a service location name, a service location address, a service location ID number, etc.), timing information associated with the network service (e.g., a date that provisioning of the network service is to begin, a date that provisioning of the network service is to end, a time of day that the network service is to be provided, a day of the week that the network service is to be provided, etc.), and/or other information associated with network service. Additionally, or alternatively, the customer service order information may include information that identifies desired configuration information associated with the network service (e.g., a desired amount of bandwidth, a desired amount of random access memory (RAM), a desired amount of computing resources, a desired amount of memory storage, etc.). In some implementations, configuration information may be determined, by product director 230, based on the desired configuration information, as discussed below. In some implementations, the customer service order information may be associated with initiating a network service, modifying a network service, adding a network service, and/or terminating a network service.

In some implementations, the customer service order information may be based on input provided (e.g., via a user interface associated with the service provider) by the customer (e.g., a user of customer device 210). For example, the customer may wish for the service provider to initiate provisioning of the network service to the service location, and may navigate to a service provider web site (e.g., associated with order manager 220) that may be used to order the network service from the service provider. In this example, the service provider web site may include a user interface that allows the customer to provide input associated with the customer service order information. Here, the customer may provide, to customer device 210, input associated with the customer service order information, and customer device 210 may forward the customer service order information to order manager 220. Order manager 220 may verify the customer service order information and/or authenticate the customer, and may forward the customer service order information to product director 230.

As further shown in FIG. 4, process 400 may include determining context information based on the customer service order information (block 420). For example, product director 230 (e.g., the business logic module of product director 230) may determine context information based on the customer service order information received by product director 230. In some implementations, product director 230 may determine the context information after product director 230 receives the customer service order information from order manager 220. Additionally, or alternatively, product director 230 may determine the context information after product director 230 determines (e.g., based on information stored by IT system 240) that the network service is available at the service location, as discussed below.

Context information may include information associated with creating a VNF (e.g., a service virtual machine (VM) configured to run on a hypervisor) that is to provide the network service, and inserting the VNF into the service provider network. For example, the context information may include information associated with the customer (e.g., a customer name, a customer ID, a customer account number, a username, a password, etc.), information associated with the network service (e.g., a service type of the network service, a quantity of devices to be provided with the network service, etc.), network insertion information associated with inserting the VNF into the service provider network (e.g., a port identifier, routing information, virtual routing and forwarding information, etc.), or another type of information.

In some implementations, product director 230 may determine the context information based on information stored by IT system 240. For example, product director 230 may receive the customer service order information, and may send, to IT system 240, one or more requests for IT system 240 to provide the context information. IT system 240 may receive the one or more requests, may determine (e.g., based on information stored by IT system 240), the context information, and may provide the context information to product director 230. In some implementations, IT system 240 may include one or more databases that store the context information. In some implementations, product director 230 may store the context information (e.g., such that the context information may be retrieved by product director 230 at a later time). In some implementations, product director 230 may determine whether the service is available to the service location before determining the context information. For example, product director 230 may receive the customer service order information and may send, to IT system 240, a request associated with determining whether the network service is available to the service location. In this example, IT system 240 may provide, to product director 230, information indicating whether the network service is available to the service location, and product director 230 may determine (e.g., based on information provided by IT system 240) whether the network service is available to the service location, accordingly. If the network service is available at the service location, product director 230 may provide, to the customer, (e.g., via order manager 220 and/or customer device 210) an indication that the network service is available, and an estimated time (e.g., 2 hours, 3 days, etc.) associated with initiating the network service. If the network service is not available at the service location, product director 230 may provide, to the customer, an indication that the network service is not currently available, and/or may provide an estimated time (e.g., 6 months, 1 year, etc.) that the network service may be available.

As further shown in FIG. 4, process 400 may include determining provisioning details associated with the network service (block 430). For example, product director 230 (e.g., the business logic module of product director 230, the financial logic module of product director 230) may determine provisioning details associated with the network service. In some implementations, product director 230 may determine the provisioning details after product director 230 determines the context information. Additionally, or alternatively, product director 230 may determine the provisioning details after product director 230 receives the customer service order information (e.g., before product director 230 determines the context information).

Provisioning details, associated with the network service, may include location information associated with the network service (e.g., a geographic location of cloud resource 260 that is to provide the network service, a logical location of cloud resource 260 that is to provide the network service, etc.), timing information associated with the network service (e.g., a time of day when provisioning of the service is to be initiated, a period of time during the network service is to be provided, etc.), quality of service (QoS) information associated with the network service (e.g., a QoS level at which the network service may be provided, etc.), pricing information associated with the network service (e.g., a cost associated with provisioning of the network service), and/or another type of information.

Additionally, or alternatively, the provisioning details may include configuration information associated with the VNF that is to provide the network service, such as sizing information (e.g., an amount of computing resources, an amount of RAM, an amount of storage, etc.), tuning information (e.g., when the network service requires a non-default VNF), and/or another type of configuration information. In some implementations, product director 230 may determine the configuration information based on the desired configuration information included in the customer service order (e.g., product director 230 may determine whether or not the VNF may be configured based on the desired configuration information).

In some implementations, product director 230 may determine the provisioning details based on information associated with product director 230. For example, product director 230 may store information associated with a heuristic algorithm associated with determining the provisioning details. In this example, product director 230 may determine (e.g., based on information received from one or more cloud resources 260) real-time information associated with network services being provided by the one or more cloud resources 260. Here, product director 230 may use the customer service order information, the real-time information, the context information, and/or the heuristic algorithm to determine the provisioning details associated with the network service.

In some implementations, product director may perform blocks 420 and 430 multiple times and/or in reverse order. In other words, determining the context information and/or the provisioning details may require product director 230 to determine context information and/or provision details multiple times before a service request may be generated and provided to cloud resource 260.

In some implementations, the business logic module of product director 230 may determine the provisioning details based on information received from the financial logic module of product director 230. For example, product director 230 may receive customer service order information that identifies a maximum price that the customer is willing to pay for the network service. In this example, the business logic module may provide the customer service order information to the financial logic module. The financial logic module may determine (e.g., based on a rules engine associated with financial logic module) whether the network service may be provided at, or below, the maximum price, and/or may determine provisioning details associated with providing the network service at, or below, the maximum price, and may notify the business logic module, accordingly.

In some implementations, product director 230 may modify an existing VNF based on additional provisioning details determined by product director 230. For example, product director 230 may cause a VNF to be created on a first cloud resource 260 based on the context information and the provisioning details, and may receive (e.g., from IT system 240) additional context information (e.g., information associated with a pricing change, information associated with a planned outage, etc.) at a later time. In this example, product director 230 may receive the additional context information and may determine additional provisioning details based on the context information. Product director 230 may then determine that the VNF is to be modified (e.g., relocated, adjusted, updated, etc.) based on the additional context information and/or the additional provisioning details, and may generate an additional service request to cause the VNF to be modified accordingly.

As further shown in FIG. 4, process 400 may include generating a service request based on the context information and the provisioning details (block 440). For example, product director 230 (e.g., the business logic module of product director 230) may generate a service request based on the context information and the provisioning details determined by product director 230. In some implementations, product director 230 may generate the service request after product director 230 determines the context information. Additionally, or alternatively, product director 230 may generate the service request after product director 230 determines the provisioning details.

A service request may include context information and/or provisioning details prepared in a format that may be used by cloud resource 260 to create and insert the VNF such that the network service is provided to the service location. In some implementations, the service request may be generated in a manner (e.g., using a particular protocol, in a particular format, etc.) such that product director 230 need only provide a single service request to cloud resource 260 (e.g., rather than providing multiple service requests) to cause cloud resource 260 to create and insert the VNF. In some implementations, the service request may include the context information and/or the provisioning details associated with the network service. Additionally, or alternatively, the service request may include the customer service order information. Additionally, or alternatively, product director 230 may generate multiple copies of a service request to allow the service request to be provided to multiple cloud resources 260.

As further shown in FIG. 4, process 400 may include providing the service request (block 450). For example, product director 230 (e.g., the business logic module of product director 230) may provide the service request to cloud resource 260. In some implementations, product director 230 may provide the service request after product director 230 generates the service request based on the context information, the provisioning details, and/or the customer service order information. Additionally, or alternatively, product director 230 may provide the service request after product director 230 identifies cloud resource 260 that is to receive the service request, as discussed below.

In some implementations, product director 230 may provide the service request based on timing information associated with the network service. For example, the provisioning details, associated with the network service, may include timing information that identifies a time (e.g., a date that the network service is to be initiated, a period of time during which the network service is to be provided, etc.) associated with providing the network service, and product director 230 may provide the service request to cloud resource 260 based on the timing information.

In some implementations, product director 230 may identify cloud resource 260 that is to receive the service request before product director 230 provides the service request. In other words, product director 230 may identify (e.g., based on the provisioning details, based on the context information) a particular cloud resource 260, of a group of cloud resources 260 managed by product director 230, to create and insert the VNF associated with the service request. In some implementations, product director 230 may identify cloud resource 260 based on a geographic area associated with cloud resource 260. For example, product director 230 may be associated with multiple cloud resources 260, and each cloud resource 260 may be configured to provide network services for a corresponding geographic area. In this example, the service request may be associated with a network service to be provided to a service location located within a particular geographic area. As such, product director 230 may provide the service request to a particular cloud resource 260 that is configured to provide network services for the particular geographic area. Additionally, or alternatively, each product director 230 could be associated with a respective logical group of cloud resources 260 (e.g., a group of cloud resources 260 associated with providing network services at a particular time, a group of cloud resources 260 associated with a particular customer type, a group of cloud resources associated with providing network services within a particular price band, etc.) Additionally, or alternatively, product director 230 may identify cloud resource 260 in another manner (e.g., based on a quantity of remaining computing capacity of cloud resource 260, based on a speed at which cloud resource 260 is able to create and insert the VNF, based on a predicted workload growth associated with cloud resource 260, based on a planned cloud resource 260 outage, based on a semi-planned cloud resource 260 outage, etc.).

In some implementations, product director 230 may determine whether cloud resource 260, identified by product director 230, is available to provide the network service. For example, product director 230 may identify cloud resource 260 and may determine (e.g., based on performance information and/or local analytics information previously received from cloud resource 260, based on a request provided to cloud resource 260, etc.) whether cloud resource 260 has sufficient resources (e.g., processing power, RAM, memory storage space, etc.) available to provide the network service. If cloud resource 260 has sufficient computing resources available, then product director 230 may provide the service request to cloud resource 260. Alternatively, if cloud resource 260 does not have sufficient computing resources available, then product director 230 may identify another cloud resource 260 to provide the network service, and may provide the service request to the other cloud resource 260.

As further shown in FIG. 4, process 400 may include receiving an indication that a VNF, associated with providing the network service, has been created and inserted based on the service request (block 460). For example, product director 230 (e.g., the business logic module of product director 230) may receive, from cloud resource 260, an indication that a VNF, associated with providing the network service, has been created and inserted (e.g., into service provider network 270) based on the service request. In some implementations, product director 230 may receive the indication after product director 230 provides the service request. Additionally, or alternatively, product director 230 may receive the indication after cloud resource 260 provides the indication.

In some implementations, the indication may indicate that cloud resource 260 has successfully created and inserted the VNF associated with the service request. For example, product director 230 may provide, to cloud resource 260, a service request associated with creating and inserting a VNF. Cloud resource 260 may create the VNF and insert the VNF based on the service request (e.g., such that the network service may be provided to the service location), and may provide, to product director 230, an indication that the VNF was successfully created and inserted.

Alternatively, the indication may indicate that cloud resource 260 did not successfully create and/or insert the VNF associated with the service request. For example, product director 230 may provide, to cloud resource 260, a service request associated with creating and inserting a VNF. Cloud resource 260 may attempt to create the VNF and/or insert the VNF based on the service request, but cloud resource 260 may be unsuccessful (e.g., when cloud resource 260 experiences an error, when cloud resource 260 is unable to create and/or insert the VNF, etc.). In this example, cloud resource 260 may provide, to product director 230, an indication that the VNF was not successfully created and inserted. Product director 230 may then send another (e.g., duplicate) service request, associated with the VNF, to cloud resource 260, or may identify another cloud resource 260 to which the service request may be provided, and may provide the service request, accordingly.

In some implementations, cloud resource 260 may insert the VNF into service provider network 270 by configuring the VNF created by cloud resource 260. For example, cloud resource 260 may configure the VNF to communicate with an edge router (e.g., associated with cloud resource 260) that is configured to receive and/or provide traffic to and/or from service provider network 270. Additionally, or alternatively, cloud resource 260 may insert the VNF into service provider network 270 by configuring physical devices included in service provider network 270. For example, cloud resource 260 may insert the network service into service provider network 270 by providing information included in the service request to a router, associated with routing traffic to and/or from the service location, included in service provider network 270 (e.g., such that the router is configured to route traffic to and/or receive traffic from the VNF included in cloud resource 260, rather than receiving and/or providing the traffic directly from and/or to the service location). In other words, the VNF may be inserted into service provider network 270 such that the VNF interacts with physical devices included in service provider network 270 in order to provide the network service to the service location.

As further shown in FIG. 4, process 400 may include providing a billing notification, associated with billing for the network service, based on receiving the indication (block 470). For example, product director 230 (e.g., a financial logic module of product director 230) may provide, to IT system 240, a billing notification, associated with billing for the network service, based on receiving the indication from cloud resource 260. In some implementations, product director 230 may provide the billing notification after product director 230 receives the indication that the VNF was successfully created and inserted into the service provider network.

In some implementations, the billing notification may include information associated with initiating billing for the network service. For example, the billing information may include an indication that IT system 240 (e.g., a billing device associated with IT system 240) is to initiate billing for the network service. Additionally, or alternatively, the billing notification may include the customer service order information, the context information associated with the network service, and/or other information associated with billing for the network service.

In some implementations, the billing notification may be provided based on the indication received from cloud resource 260. For example, cloud resource 260 may provide, to the business logic module of product director 230, the indication that the VNF has been successfully created and inserted into service provider network 270. In this example, the business logic module may provide an indication that the network service has been initiated (e.g., since the VNF has been successfully created and inserted), the customer service order information, and/or the context information to the financial logic module. The financial logic module may generate a billing notification, associated with billing for the network service, and may provide the billing notification to IT system 240 (e.g., and IT system 240 may initiate billing for the network service, accordingly).

In some implementations, product director 230 may receive, from cloud resource 260, performance information and/or local analytics information, and the financial logic module of product director 230 may determine billing information associated with the network service provided by the VNF. For example, the financial logic module may receive performance information associated with the VNF, and may implement a financial rules engine that includes a billing model associated with the network service, a billing interval associated with the network service, a pricing structure associated with the network service, etc. to determine the billing information. In this example, the financial logic module may provide the billing information to IT system 240 to cause the customer to be billed for the network service. In some implementations, the financial logic module may implement customer and/or network service specific billing rules when determining the billing information.

In this way, product director 230 may generate a service request, associated with creating and inserting a VNF configured to provide a network service, determine that the VNF has been created and inserted, and provide a billing notification such that billing for the network service may be initiated.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5A:
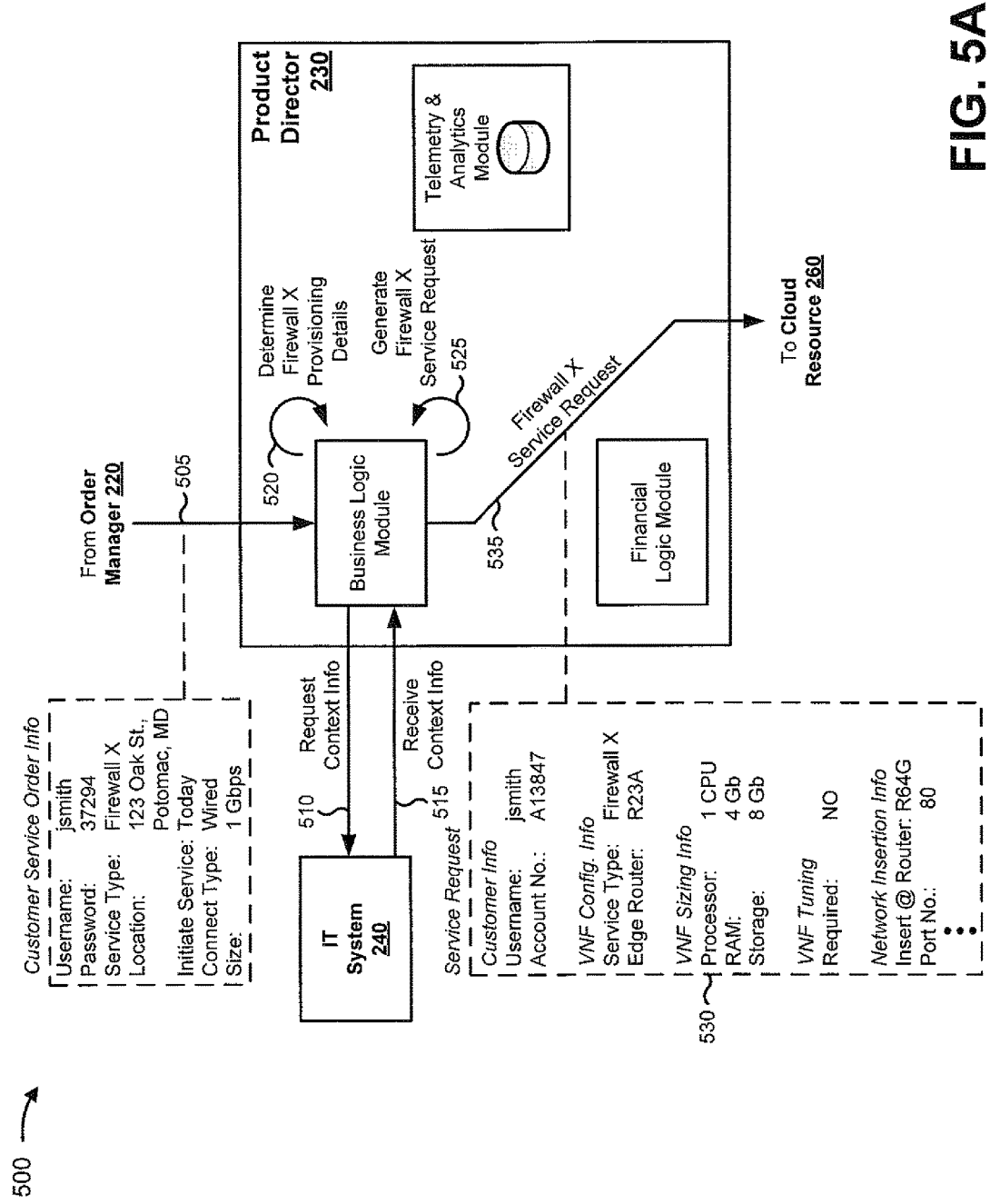
FIGS. 5A and 5B are diagrams of an example implementation relating to the example process shown in FIG. 4.
Figure 5B:
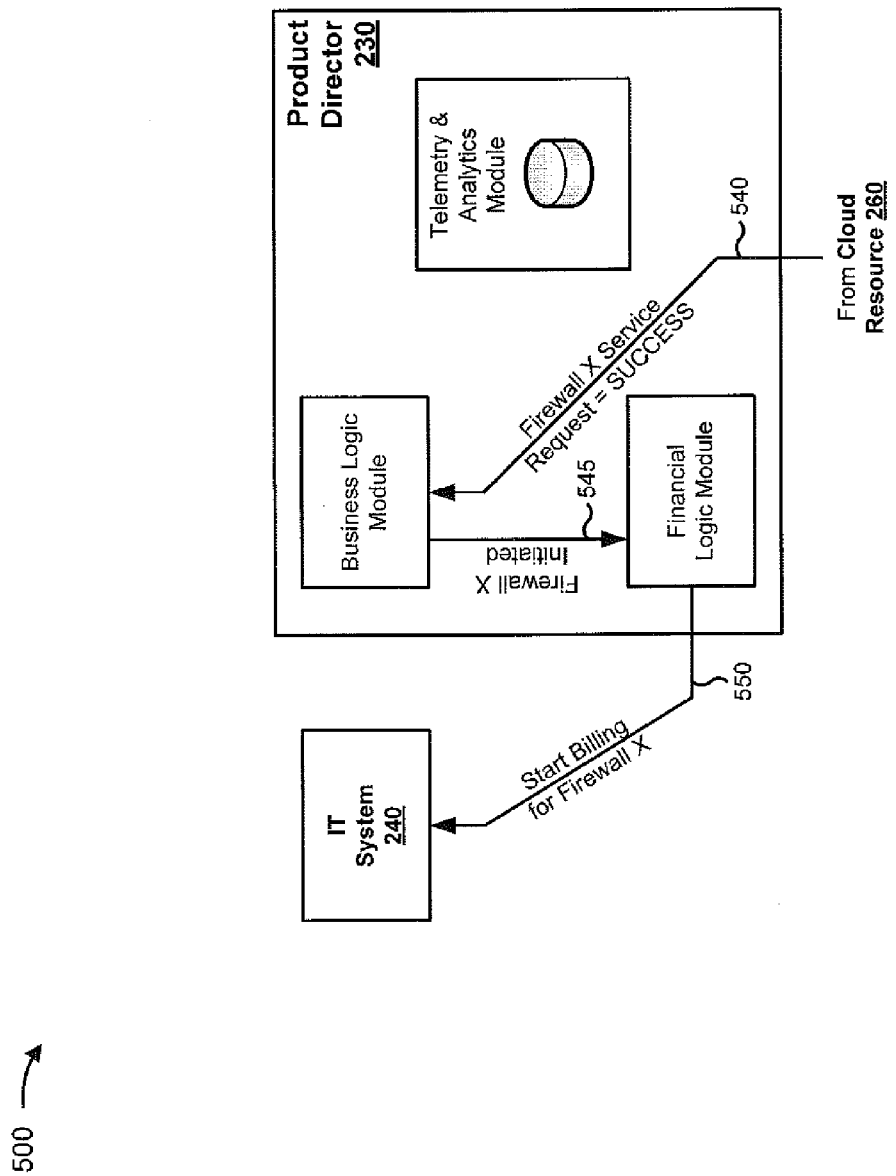

FIGS. 5A and 5B are diagrams of an example implementation 500 relating to example process 400 shown in FIG. 4. For the purposes of example implementation 500, assume that a customer, John Smith, has provided, via customer device 210, customer service order information, associated with providing a Firewall X network service, to a service location identified as 123 Oak Street, Potomac, Md. Further, assume that customer device 210 has provided the customer service order information to order manager 220. Finally, assume that order manager 220 has verified the Firewall X order information and is configured to provide the Firewall X order information to product director 230 for further processing.

As shown in FIG. 5A, and by reference number 505, order manager 220 may provide the Firewall X order information to a business logic module of product director 230. As shown, the Firewall X order information may include a username associated with the customer (e.g., jsmith), a password associated with the username (e.g., 37294), information identifying the network service (e.g., Firewall X), information identifying the service location (e.g., 123 Oak Street, Potomac, Md.), a time to initiate provisioning of the network service (e.g., Today), a connection type associated with the service location (e.g., Wired), and sizing information associated with the network service (e.g., 1 Gigabit per second (Gbps)).

As shown by reference number 510, the business logic module may send, to IT system 240, one or more requests for context information based on the customer service order information. As shown by reference number 515, IT system 240 may determine (e.g., based on information stored by IT system 240) the context information, and may provide, to the business logic module, responses to the one or more requests that include the context information.

As shown by reference number 520, the business logic module may receive the context information, and may determine (e.g., based on the context information, based on an algorithm, based on a geographic location of the service location, etc.) provisioning details associated with providing Firewall X to the service location. In some implementations, the order of steps between reference numbers 510 and 520 may be reversed and/or may be performed multiple times to allow the business logic module to determine the context information and/or the provisioning details associated with providing the Firewall X network service to the service location.

As shown by reference number 525, the business logic module may also generate, based on the context information and the provisioning details, a Firewall X service request associated with creating and inserting a VNF configured to provide Firewall X to the service location. As shown by reference number 530, the Firewall X service request may contain (e.g., based on the context information and the provisioning details) information associated with the customer (e.g., Username: jsmith, Account No.: A13847), configuration information associated with the VNF (e.g., Service Type: Firewall X, Edge Router: R23A), VNF sizing information (e.g., Processors: 1 CPU, RAM: 4Gb, Storage: 8 Gb), information indicating that the VNF does not require tuning (e.g., Required: NO), network insertion information (e.g., Insert @ Router: R64G, Port No. 80), and/or additional information associated with creating and/or inserting the VNF. As shown by reference number 535, the business logic module may provide the Firewall X service request to the cloud resource 260 identified by the business logic module.

For the purposes of FIG. 5B, assume that cloud resource 260 has received the Firewall X service request and has created the VNF and inserted the VNF into service provider network 270 based on the Firewall X service request (e.g., such that the Firewall X service may be provided to the service location). As shown in FIG. 5B, and by reference number 540, the business logic module may receive, from cloud resource 260, an indication that cloud resource 260 has successfully created and inserted the VNF based on the Firewall X service request. As shown by reference number 545, the business logic module may provide, to a financial logic module of product director 230, an indication that provision of the Firewall X service to the service location has been initiated. As shown by reference number 550, the financial logic module may receive the indication, and may provide, to IT system 240, a billing notification indicating that IT system 240 is to initiate customer billing for the Firewall X service.

As indicated above, FIGS. 5A and 5B are provided merely as an example. Other examples are possible and may differ from what was described with regard to FIGS. 5A and 5B.

FIG. 6 is a flow chart of an example process 600 for receiving performance information and/or local analytics information, associated with a virtual network function, and causing the virtual network function to be modified based on the performance information and/or the local analytics information. In some implementations, one or more process blocks of FIG. 6 may be performed by product director 230. In some implementations, one or more process blocks of FIG. 6 may be performed by another device or a group of devices separate from or including product director 230, such as another device include in environment 200.

As shown in FIG. 6, process 600 may include receiving performance information and/or local analytics information associated with a virtual network function (block 610). For example, product director 230 (e.g., a telemetry and analytics module of product director 230) may receive, from cloud resource 260, performance information and/or local analytics information associated with a VNF. In some implementations, product director 230 may receive the performance information and/or the local analytics information when cloud resource 260 provides the performance information and/or the local analytics information. Additionally, or alternatively, product director 230 may receive the performance information and/or the local analytics information when product director 230 requests, from cloud resource 260 the performance information and/or the local analytics information.

Performance information, associated with a VNF, may include information associated with one or more performance metrics associated with the VNF. For example, the performance information may include an amount of computing resources consumed by the VNF, an amount of RAM used by the VNF, an amount of memory storage used by the VNF, an amount of bandwidth used by the VNF, and/or another type of performance metric. In some implementations, cloud resource 260 may determine the performance information (e.g., in-real time, on a periodic basis, etc.). Local analytics information, associated with a VNF, may include information associated with analyzing the performance information associated with the VNF. For example, cloud resource 260 may determine performance information associated with the VNF, and may perform (e.g., based on an algorithm, a model, etc. stored by cloud resource 260) local analytics based on the performance information to determine local analytics information associated with the VNF. In some implementations, the performance information and/or the local analytics information may be determined at different time granularities (e.g., first performance information, associated with a first VNF, may be determined every 1 second, while second performance information, associated with a second VNF, may be determined every 5 seconds, etc.).

In some implementations, product director 230 may receive the performance information and/or the local analytics information as cloud resource 260 determines the performance information and/or the local analytics information (e.g., in real-time), on a periodic basis (e.g., every 5 seconds, every 30 seconds, etc.), or in another manner. In some implementations, product director 230 may receive performance information and/or local analytics information from multiple cloud resources 260 (e.g., when product director 230 is configured to manage the multiple cloud resources 260). Additionally, or alternatively, product director 230 may receive performance information and/or local analytics information associated with multiple VNFs.

As further shown in FIG. 6, process 600 may include determining, based on the performance information and/or the local analytics information, that the virtual network function is to be modified (block 620). For example, product director 230 (e.g., the telemetry and analytics module of product director 230) may determine, based on the performance information and/or the local analytics information, that the VNF is to be modified. In some implementations, product director 230 may determine that the VNF is to be modified after product director 230 receives the performance information and/or the local analytics information associated with the VNF. Additionally, or alternatively, product director 230 may determine that the VNF is to be modified after product director 230 performs global analytics based on the performance information and/or the local analytics information, as discussed below.

In some implementations, product director 230 may determine that the VNF is to be modified based on the performance information and/or the local analytics information received from cloud resource 260. For example, product director 230 may receive, from multiple cloud resources 260, performance information and local analytics information associated with multiple VNFs. Product director 230 may perform (e.g., using a global analytics algorithm, a global analytics model, etc.) global analytics based on the performance information and the local analytics information to determine global analytics information (e.g., predictive workload balancing, usage trends, predictive billing information, dynamic pricing information, etc.). In this example, the global analytics information may indicate a manner in which one or more of the multiple VNFs are to be modified in order to assure that the multiple VNFs are adequately providing their respective network services. In some implementations, product director 230 may perform global analytics based on the performance information, the local analytics information, environmental information, geo-political information, and/or information associated with one or more physical devices included in service provider network 270. In some implementations, product director 230 may determine modification information (e.g., information indicating a manner in which a VNF is to be modified) based on the global analytics information. Additionally, or alternatively, the global analytics information may be provided to another device associated with service provider network 270.

As further shown in FIG. 6, process 600 may include causing the virtual network function to be modified (block 630). For example, product director 230 (e.g., the telemetry and analytics module of product director 230) may cause the VNF to be modified. In some implementations, product director 230 may cause the VNF to be modified after product director 230 determines that the VNF is to be modified (e.g., after the telemetry and analytics module analyzes the performance information and/or the local analytics information). Additionally, or alternatively, product director 230 may cause the VNF to be modified after product director 230 determines modification information based on a result of performing the global analytics.

In some implementations, product director 230 may cause cloud resource 260 to modify the VNF. For example, product director 230 may cause cloud resource 260 to modify a configuration of the VNF, relocate the VNF (e.g., to another computing resource associated with cloud resource 260), recreate the VNF (e.g., on another cloud resource 260), or otherwise change, adjust, or alter the VNF.

In some implementations, product director 230 may cause the VNF to be modified by sending a service request to cloud resource 260 associated with the VNF. For example, the telemetry and analytics module of product director 230 may determine (e.g., based on performing global analytics) modification information associated with the VNF, and may provide the modification information to the business logic model module of product director 230. The business logic module may receive the modification information, may determine stored context information and/or provisioning details associated with the VNF (e.g., when the business logic model is configured to store context information and/or the provisioning details when initially causing the VNF to be created and inserted), and may generate a new service request, associated with the VNF, based on the modification information and the stored context information. The business logic module may then provide the new service request to cloud resource 260 associated with the VNF (e.g., or to another cloud resource 260 when the telemetry and analytics module determines that the VNF is to be recreated on another cloud resource 260). Cloud resource 260 may receive the new service request and may act, accordingly.

In this way, product director 230 may determine whether network services, provided by VNFs running on cloud resources 260 managed by product director 230, are being adequately provided, and may cause the VNFs to be modified accordingly. In other words, product director 230 may globally manage network services being provided across multiple cloud resources 260.

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

Figure 7A:
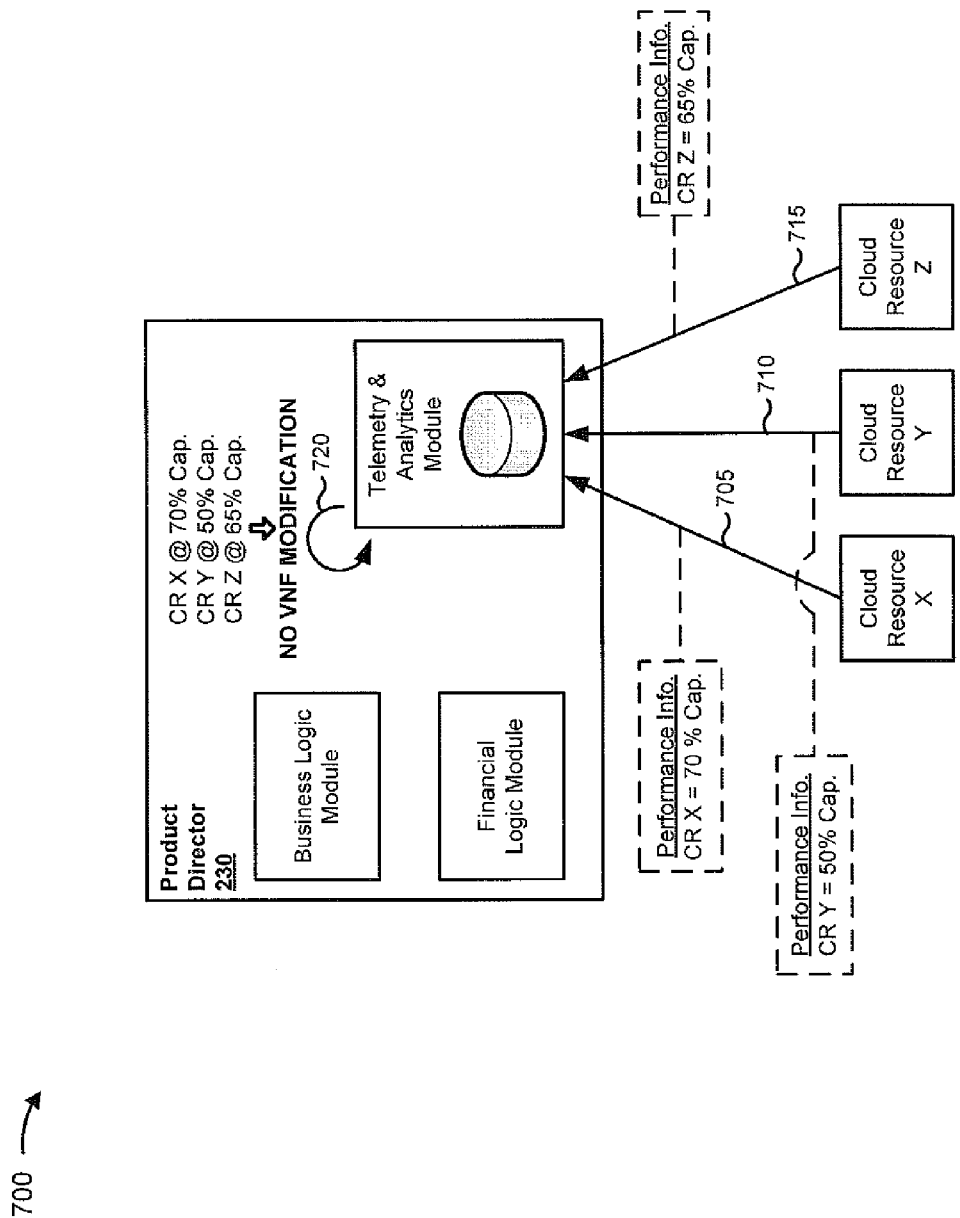
FIGS. 7A-7C are diagrams of an example implementation relating to the example process shown in FIG. 6.
Figure 7B:
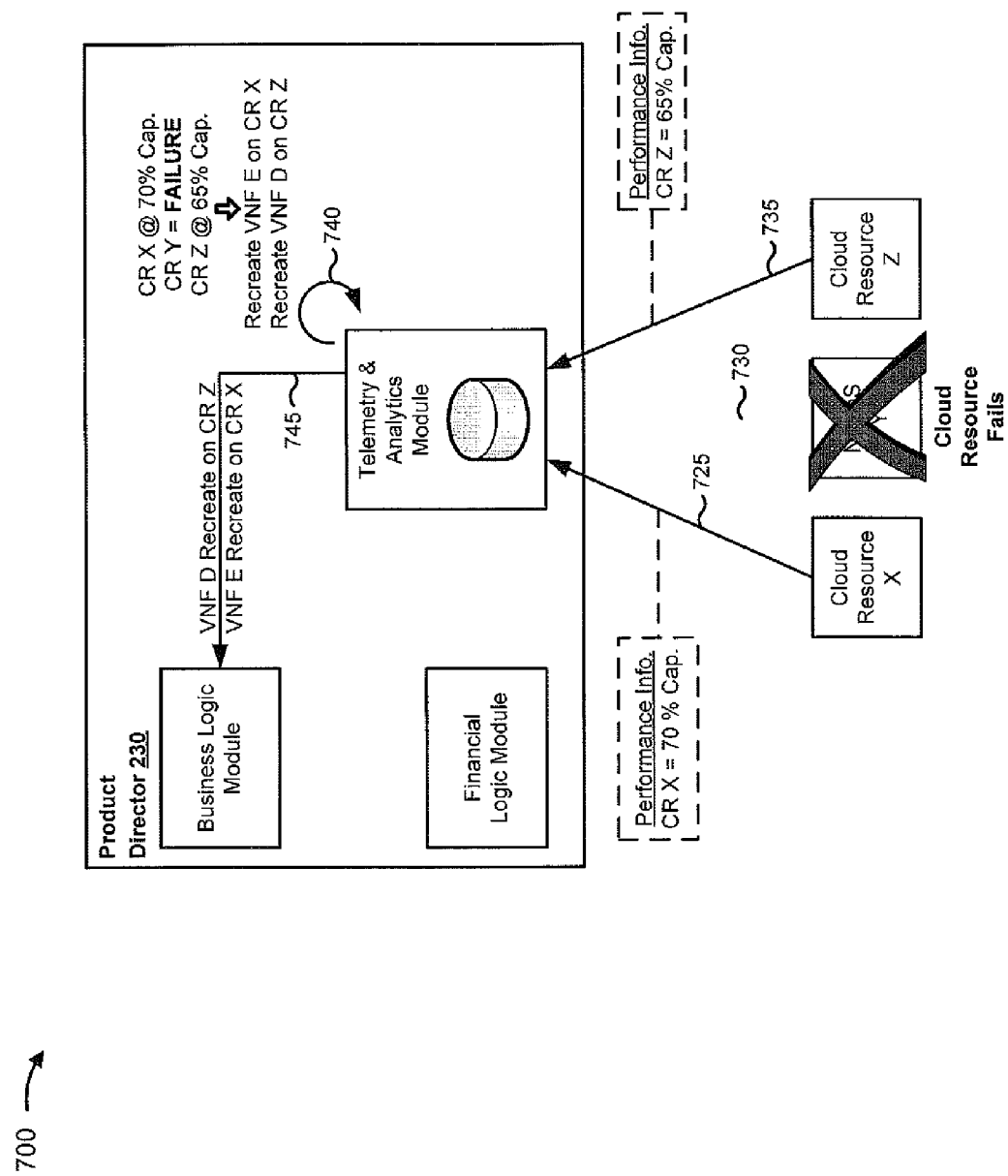
Figure 7C:
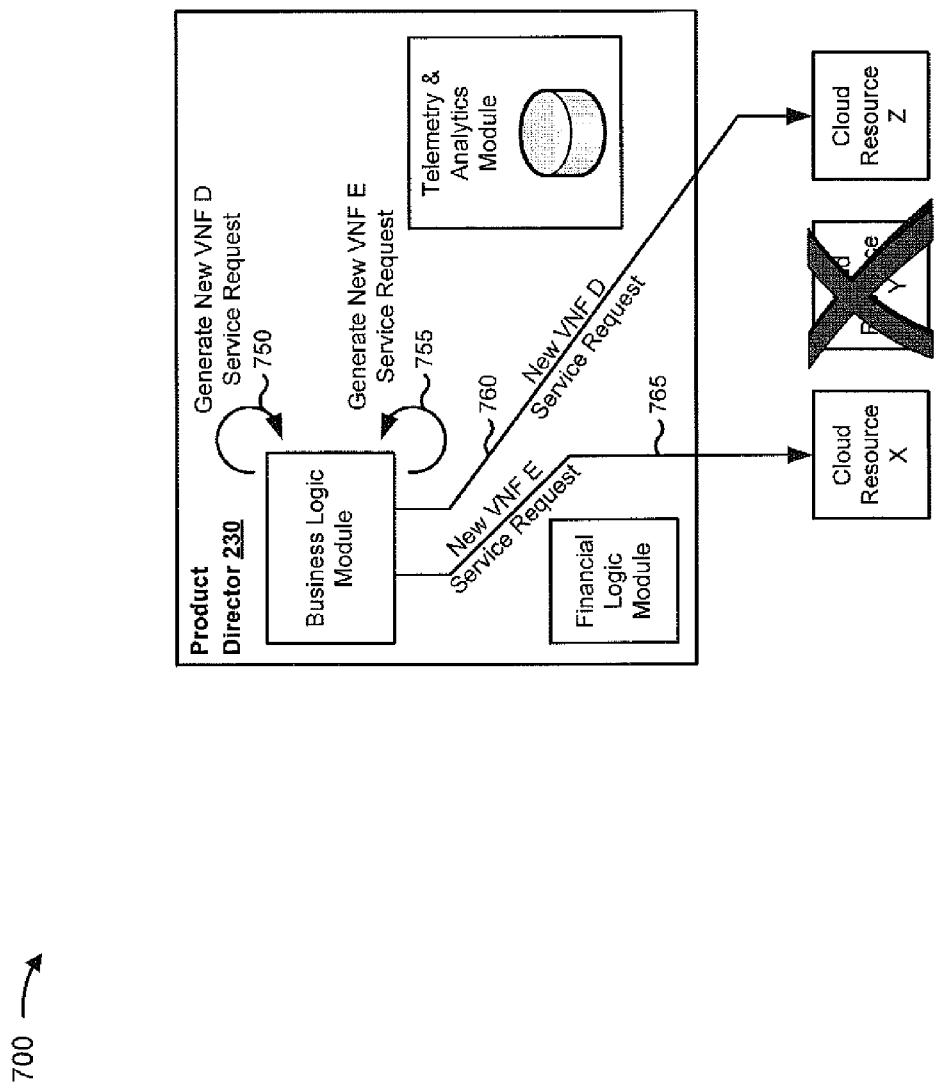

FIGS. 7A-7C are diagrams of an example implementation 700 relating to example process 600 shown in FIG. 6. For the purposes of example implementation 700, assume that product director 230 is configured to manage VNFs (e.g., associated with providing network services to various service locations) running on cloud resources identified as cloud resource X, cloud resource Y, and cloud resource Z. Further, assume that three VNFs (e.g., VNF A, VNF B, and VNF C) are running on cloud resource X, that two VNFs (e.g., VNF D, and VNF E) are running on cloud resource Y, and that three VNFs (e.g., VNF F, VNF G, and VNF H) are running on cloud resource Z. Finally, assume that cloud resource X, cloud resource Y, and cloud resource Z are configured to provide performance information, associated with their respective VNFs, to a telemetry and analytics module of product director 230 at two second intervals.

As shown in FIG. 7A, and by reference number 705, cloud resource X may provide, to the telemetry and analytics module of product director 230, performance information indicating that VNF A, VNF B, and VNF C are using 70% of the computing resources of cloud resource X. As shown by reference number 710, cloud resource Y may provide, to the telemetry and analytics module of product director 230, performance information indicating that VNF D and VNF E are using 50% of the computing resources of cloud resource Y. As shown by reference number 715, cloud resource Z may provide, to the telemetry and analytics module of product director 230, performance information indicating that VNF F, VNF G, and VNF H are using 65% of the computing resources of cloud resource Z.

As shown by reference number 720, the telemetry and analytics module may receive the performance information from each cloud resource, and may determine that none of the VNFs require modification (e.g., since each cloud resource is operating below 100% capacity).

For the purposes of FIG. 7B, assume that cloud resource Y experiences a power failure one second after providing the performance information associated with VNF D and VNF E, such that VNF D and VNF E are no longer running on cloud resource Y. As shown by reference number 725, cloud resource X may provide (e.g., one second after the cloud resource Y power failure) performance information indicating that VNF A, VNF B, and VNF C are still using 70% of the computing resources of cloud resource X. As shown by reference number 730, cloud resource Y may not provide any performance information (e.g., due to the cloud resource Y power failure). As shown by reference number 735, cloud resource Z may provide, to the telemetry and analytics module of product director 230, performance information indicating that VNF F, VNF G, and VNF H are still using 65% of the computing resources of cloud resource Z.

As shown by reference number 740, the telemetry and analytics module may determine that cloud resource X and cloud resource Z are still operating below 100% capacity, and may determine (e.g., since no cloud resource Y performance information was received), that cloud resource Y has failed and that VNF D and VNF E are no long running on cloud resource Y. As further shown, the telemetry and analytics module may determine that VNF D and VNF E are to be recreated (e.g., since the network services associated with VNF D and VNF E are not being provided). As shown by reference number 745, the telemetry and analytics module may determine (e.g., by performing global analytics based on the cloud resource X and cloud resource Z performance information) that VNF D is to be recreated on cloud resource Z and that VNF E is to be recreated on cloud resource X, and may provide modification information, associated with recreating VNF D and VNF E, to the business logic module of product director 230.

As shown in FIG. 7C, and by reference number 750, the business logic module may receive the modification information associated with VNF D, and may generate (e.g., based on the VNF D modification information and based on stored context information and/or provisioning details associated with VNF D) a new VNF D service request. Similarly, as shown by reference number 755, the business logic module may receive the modification information associated with VNF E, and may generate (e.g., based on the VNF E modification information and based on stored context information and/or provisioning details associated with VNF E) a new VNF E service request. As shown by reference number 760, the business logic module may provide the new VNF D service request to cloud resource Z, and, as shown by reference number 765, may provide the new VNF E service request to cloud resource X. Cloud resource X and cloud resource Z may then create and insert VNF E and VNF D, respectively, such that the network services associated with VNF E and VNF D are provided (e.g., to their respective service locations) via the service provider network.

As indicated above, FIGS. 7A-7C are provided merely as an example. Other examples are possible and may differ from what was described with regard to FIGS. 7A-7C.

Implementations described herein may allow virtual network functions, associated with providing network services, to be globally managed (e.g., created, inserted, configured, updated, modified, etc.) such that the network services are provided in an agile, on-demand, and/or flexible manner without the need to manually configure, monitor, and/or update devices in the service provider network.

The foregoing disclosure provides illustration and description, but is not intended to be exhaustive or to limit the implementations to the precise form disclosed. Modifications and variations are possible in light of the above disclosure or may be acquired from practice of the implementations. For example, product director 230 may be capable of simulating the creation and/or insertion of a VNF into the service provider network to determine where a network service will be provisioned without causing the VNF to be created or inserted (e.g., in order to determine pricing information associated with the network service). Similarly, product director 230 may provided with performance information associated with simulated, planned, and/or semi-planned outages associated with one or more cloud resources 260 in order to predict re-distribution of network services among the one or more cloud resources 260.

As used herein, the term component is intended to be broadly construed as hardware, firmware, and/or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive customer service order information,
      the customer service order information identifying a network service that is to be provided to a service location, associated with a customer, via a service provider network;
   determine context information associated with providing the network service,
      the context information being determined based on the customer service order information;
   determine provisioning details associated with providing the network service,
      the provisioning details being determined based on the context information;
   generate a service request based on the context information and the provisioning details,
      the service request including information associated with a virtual network function (VNF) that is to provide the network service to the service location;
   identify a cloud resource, managed by the device, that is to host the VNF;
   provide the service request to the cloud resource,
      the service request being provided to cause the VNF to be created and inserted into the service provider network,
      the VNF being created such that the VNF operates on the cloud resource,
      the VNF being inserted into the service provider network such that the network service is provided to the service location via the service provider network, and
      the VNF interacting with a physical device of the service provider network;
   request, from a group of cloud resources, local analytics information associated with a group of VNFs,
      the group of VNFs including the VNF, and
      the group of cloud resources including the cloud resource;
   receive the local analytics information,
      the received local analytics information not including local analytics information from the cloud resource that hosts the VNF;
   determine, based on the received local analytics information not including the local analytics information from the cloud resource that hosts the VNF, that the cloud resource has failed; and
   cause the VNF to be relocated to another cloud resource, of the group of cloud resources, based on determining that the cloud resource has failed.

2. The device of claim 1, where the one or more processors are further to:
   receive an indication that the VNF was successfully created and inserted into the service provider network; and
   provide a billing notification based on receiving the indication,
      the billing notification being provided to cause billing for the network service to be initiated.

3. The device of claim 1, where the context information includes at least one of:
   information associated with the customer;
   billing information associated with the network service; or network insertion information associated with inserting the network service into the service provider network.

4. The device of claim 1, where the one or more processors are further to:
determine a geographic area associated with the service location;
identify another group of cloud resources that is to provide network services within the geographic area; and
identify the cloud resource that is to host the VNF as one of the other group of cloud resources that is to provide network services within the geographic area.

5. The device of claim 1, where the provisioning details, associated with the network service, include at least one of:
configuration information associated with the network service;
sizing information associated with the network service;
tuning information associated with the network service;
location information associated with the network service;
timing information associated with the network service;
quality of service information associated with the network service; or
pricing information associated with the network service.

6. A computer-readable medium storing instructions, the instructions comprising:
one or more instructions that, when executed by one or more processors, cause the one or more processors to:
receive order information that identifies a network service that is to be provided to a service location via a service provider network,
the service location being associated with a customer;
determine context information associated with providing the network service,
the context information being determined based on the order information;
determine provisioning details associated with the network service,
the provisioning details being determined based on the context information;
create a service request based on the context information and the provisioning details,
the service request including information associated with a virtual network function (VNF) that is to provide the network service to the service location;
determine a cloud resource on which the VNF is to operate;
send the service request to the cloud resource,
the service request being sent to cause the VNF to be created on the cloud resource and inserted into the service provider network,
the VNF being created and inserted into the service provider network to cause the network service to be provided to the service location via the service provider network, and
the VNF interacting with a physical device of the service provider network;
request, from a group of cloud resources, local analytics information associated with a group of VNFs,
the group of VNFs including the VNF, and
the group of cloud resources including the cloud resource;
receive the local analytics information,
the received local analytics information not including local analytics information from the cloud resource that hosts the VNF;
determine, based on the received local analytics information not including the local analytics information from the cloud resource that hosts the VNF, that the cloud resource has failed; and
cause the VNF to be relocated to another cloud resource, of the group of cloud resources, based on determining that the cloud resource has failed.

7. The computer-readable medium of claim 6, where the one or more instructions, when executed by the one or more processors, further cause the one or more processors to:
receive an indication that the VNF was successfully created and inserted into the service provider network; and
provide a billing notification based on receiving the indication,
the billing notification being provided to cause billing for the network service to be initiated.

8. The computer-readable medium of claim 6, where the context information includes at least one of:
information associated with the customer;
billing information associated with the service request; or
network insertion information associated with inserting the network service into the service provider network.

9. The computer-readable medium of claim 6,
where the one or more instructions, when executed by the one or more processors, further cause the one or more processors to:
send a request for the context information based on receiving the order information,
the request including the order information; and
where the one or more instructions, that cause the one or more processors to determine the context information, cause the one or more processors to:
determine the context information based on a response to the request.

10. The computer-readable medium of claim 6, where the provisioning details, associated with the network service, include at least one of:
configuration information associated with the network service;
sizing information associated with the network service;
tuning information associated with the network service;
location information associated with the network service;
timing information associated with the network service;
quality of service information associated with the network service; or
pricing information associated with the network service.

11. A method, comprising:
obtaining, by a device, customer service order information,
the customer service order information identifying a network service and a service location associated with the network service,
the network service being associated with a service provider network;
determining, by the device, context information associated with providing the network service,
the context information being determined based on the customer service order information;
determining, by the device, provisioning details associated with the network service,
the provisioning details being determined based the context information;
generating, by the device, a service request that includes the context information and the provisioning details, the service request including information associated with creating a virtual network function (VNF) that is to provide the network service to the service location,
the service request including information associated with inserting the VNF into the service provider network;
identifying, by the device, a cloud resource that is to host the VNF,
the cloud resource being included in a cloud computing environment, and
the cloud resource being managed by the device;
providing, by the device, the service request to the cloud resource to cause the VNF to be inserted into the service provider network,
the VNF being inserted into the service provider network such that the network service is provided to the service location via the service provider network, and
the VNF interacting with a physical device of the service provider network;
requesting, by the device and from a group of cloud resources, local analytics information associated with a group of VNFs,
the group of VNFs including the VNF, and
the group of cloud resources including the cloud resource;
receiving, by the device, the local analytics information,
the received local analytics information not including local analytics information from the cloud resource that hosts the VNF;
determining, by the device and based on the received local analytics information not including the local analytics information from the cloud resource that hosts the VNF, that the cloud resource has failed; and
causing, by the device, the VNF to be relocated to another cloud resource, of the group of cloud resources, based on determining that the cloud resource has failed.

12. The method of claim 11, further comprising:
receiving an indication that the VNF was successfully inserted into the service provider network; and
providing a billing notification based on receiving the indication,
the billing notification being provided to cause billing for the network service to be initiated.

13. The method of claim 11, further comprising:
sending a request for the context information based on receiving the customer service order information, the request including the customer service order information; and
where determining the context information further comprises:
determining the context information based on a response to the request.

14. The method of claim 11, further comprising:
determining a geographic area associated with the service location;
identifying another group of cloud resources that is configured to provide network services within the geographic area; and
identifying the cloud resource that is to host the VNF as one of the other group of cloud resources that is configured to provide network services within the geographic area.

15. The device of claim 1, where the one or more processors, when causing the VNF to be relocated to the other cloud resource, are to:
cause the VNF to be relocated to the other cloud resource based on determining that the other cloud resource is operating at less than full capacity.

16. The device of claim 1, where the one or more processors, when receiving the local analytics information, are to:
receive the local analytics information in real time.

17. The computer-readable medium of claim 6, where the one or more instructions, that cause the one or more processors to cause the VNF to be relocated to the other cloud resource, cause the one or more processors to:
cause the VNF to be relocated to the other cloud resource based on determining that the other cloud resource is operating at less than full capacity.

18. The computer-readable medium of claim 6, where the one or more instructions, that cause the one or more processors to receive the local analytics information, cause the one or more processors to:
receive the local analytics information in real time.

19. The method of claim 11, where causing the VNF to be relocated to the other cloud resource comprises:
causing the VNF to be relocated to the other cloud resource based on determining that the other cloud resource is operating at less than full capacity.

20. The method of claim 11, where receiving the local analytics information comprises:
receiving the local analytics information in real time.

* * * * *